United States Patent
Wang et al.

(10) Patent No.: US 6,199,784 B1
(45) Date of Patent: Mar. 13, 2001

(54) AUTOMATICALLY REWINDABLE WIRE DEVICE

(75) Inventors: Robert Wang, Taipei; Jack Wang, Taichung Hsien, both of (TW)

(73) Assignee: Ceramate Technical Co., Ltd., Toa-Yuan Hsien (TW)

( * ) Notice: Subject to any disclaimer, the term of this patent is extended or adjusted under 35 U.S.C. 154(b) by 0 days.

(21) Appl. No.: 09/407,883

(22) Filed: Sep. 29, 1999

(51) Int. Cl.[7] .................................................. B65H 75/48
(52) U.S. Cl. ..................... 242/378; 242/385.4; 242/388
(58) Field of Search ............................ 242/378, 378.4, 242/385.4, 388, 388.6

(56) References Cited

U.S. PATENT DOCUMENTS

| | | | |
|---|---|---|---|
| 3,412,951 | * | 11/1968 | Ober ....................................... 242/388 |
| 3,545,693 | * | 12/1970 | Gurner et al. ...................... 242/388.6 |
| 3,657,491 | * | 4/1972 | Ryder et al. ....................... 242/378 X |
| 4,162,009 | * | 7/1979 | Schouten ........................... 242/378 X |
| 4,773,623 | * | 9/1988 | Nabinger ........................ 242/385.4 X |
| 5,098,028 | * | 3/1992 | Ida et al. ............................ 242/388.6 |
| 5,328,112 | * | 7/1994 | Obata .................................... 242/388 |
| 5,707,023 | * | 1/1998 | Ichikawa et al. ...................... 242/388 |

FOREIGN PATENT DOCUMENTS

| | | | |
|---|---|---|---|
| 697640 | * | 9/1953 | (GB) ...................................... 242/378 |
| 1590160 | * | 5/1981 | (GB) ...................................... 242/378 |
| 5226045 | * | 9/1993 | (JP) ..................................... 242/388.6 |

* cited by examiner

*Primary Examiner*—Donald P. Walsh
*Assistant Examiner*—William A. Rivera
(74) *Attorney, Agent, or Firm*—Foley & Lardner (57) ABSTRACT

An automatically rewindable wire device includes a stationary member having a stationary shaft, and a rotary member mounted rotatably on the stationary member and having a windup portion around the shaft. The windup portion and the shaft confine a space. The windup portion has an opening which is communicated with the space and which is spaced apart radially from the shaft. The device further includes a wire having a first portion fixed to the stationary member and a second portion extending outwardly of the stationary member from the first portion of the wire. The second portion of the wire is wound around the shaft in a first angular direction within the space and then wound around the windup portion in a second angular direction by passing through the opening. The second angular direction is opposite to the first angular direction. A windup spring is connected to the rotary member to urge the windup portion to wind up the wire.

12 Claims, 7 Drawing Sheets

AUTOMATICALLY REWINDABLE WIRE DEVICE

BACKGROUND OF THE INVENTION

1. Field of the invention

This invention relates to an automatically rewindable wire device, more particularly to an automatically rewindable wire device for storing a flexible wire strip therein.

2. Description of the related art

Figure 1:
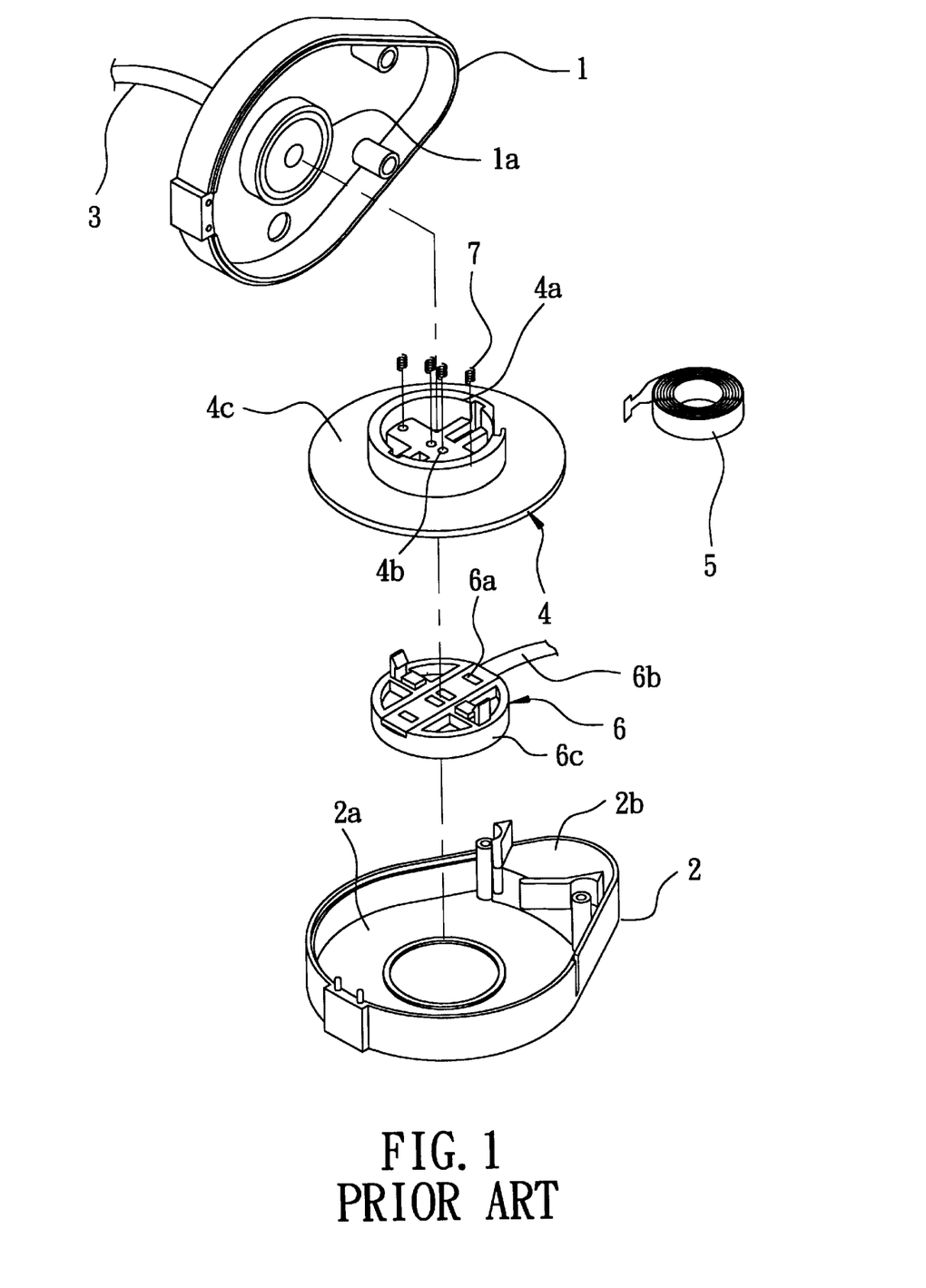
FIG. 1 is an exploded view of a conventional automatically rewindable wire device.

FIG. 1 illustrates a conventional automatically rewindable wire device for storing a connecting wire of an electronic device, such as a telephone set, a TV set, or a computer. The rewindable wire device normally includes a housing having upper and lower housing halves 1, 2. A pair of positive and negative electrodes in the form of concentrically conductive rings 1a are mounted on the upper housing half 1, and are connected to a connecting wire 3 which extends outside the housing. The lower housing half 2 has a first receiving recess 2a for receiving a rotary member 4, and a second receiving recess 2b for receiving a windup spring 5. The rotary member 4 includes a disc 4c, an annular frame 4a extending upwardly from the disc 4c, and a plurality of through-holes 4b formed in the disc 4c and surrounded by the annular frame 4a. A circular-shaped connecting wire receptacle 6 is mounted on the bottom side of the disc 4c, and has a surrounding wall 6c and a plurality of conductive plates 6a fixed thereon. Each conductive plate 6a is aligned with the corresponding one of the through-holes 4b. A connecting wire 6b is connected to the conductive plates 6a, and extends outside the housing. A conductive spring 7 extends through each through-hole 4b so as to be in sliding contact with the corresponding one of the conductive rings 1a and the corresponding one of the conductive plates 6a, thereby connecting electrically the connecting wire 3 to the connecting wire 6b. The windup spring 5 is connected to the annular frame 4a to urge the surrounding wall 6c of the receptacle 6 to windup the connecting wire 6b around the surrounding wall 6c.

Since the aforementioned device requires the use of the conductive rings 1a, the conductive plates 6a, and the conductive springs 7 so as to prevent the connecting wire 3 from twisting upon rotation of the rotary member 4, it is complicated and laborious to assemble. Moreover, since the conductive rings 1a and the conductive plates 6a are in sliding contact with the conductive springs 7, poor electrical connection between the conductive rings 1a and the conductive plates 6a can easily occur.

SUMMARY OF THE INVENTION

Therefore, it is an object of the present invention to provide an automatically rewindable wire device that dispenses with the aforementioned conductive rings, the conductive plates, and the conductive springs, thereby eliminating the occurrence of poor electrical connection as described above.

According to one aspect of this invention, an automatically rewindable wire device of this invention comprises: a stationary member having a stationary shaft; a rotary member mounted rotatably on the stationary member and having a windup portion around the shaft, the windup portion and the shaft confining a space, the windup portion having an opening which is communicated with the space and which is spaced apart radially from the shaft; a wire having a first portion fixed to the stationary member and a second portion extending from the first portion of the wire, the second portion of the wire being wound around the shaft in a first angular direction within the space and then wound around the windup portion in a second angular direction by passing through the opening, the second angular direction being opposite to the first angular direction; and a windup spring connected to the rotary member to urge the windup portion to wind up the wire.

According to another aspect of this invention, an automatically rewindable wire device of this invention comprises: a stationary shaft; a rotary member mounted rotatably on the shaft and having a windup portion sleeved around the shaft, the windup portion and the shaft confining a space, the windup portion having an opening which is communicated with the space and which is spaced apart radially from the shaft; a wire having a first portion fixed to the shaft and a second portion extending outwardly of the space by passing through the opening from the first portion; and a windup spring connected to the rotary member to urge the windup portion to wind up the second portion of the wire around the shaft in a first angular direction within the space and around the windup portion in a second angular direction opposite to the first angular direction simultaneously.

BRIEF DESCRIPTION OF THE DRAWINGS

In drawings which illustrate an embodiment of the invention.

DETAILED DESCRIPTION OF THE PREFERRED EMBODIMENT

Figure 2:
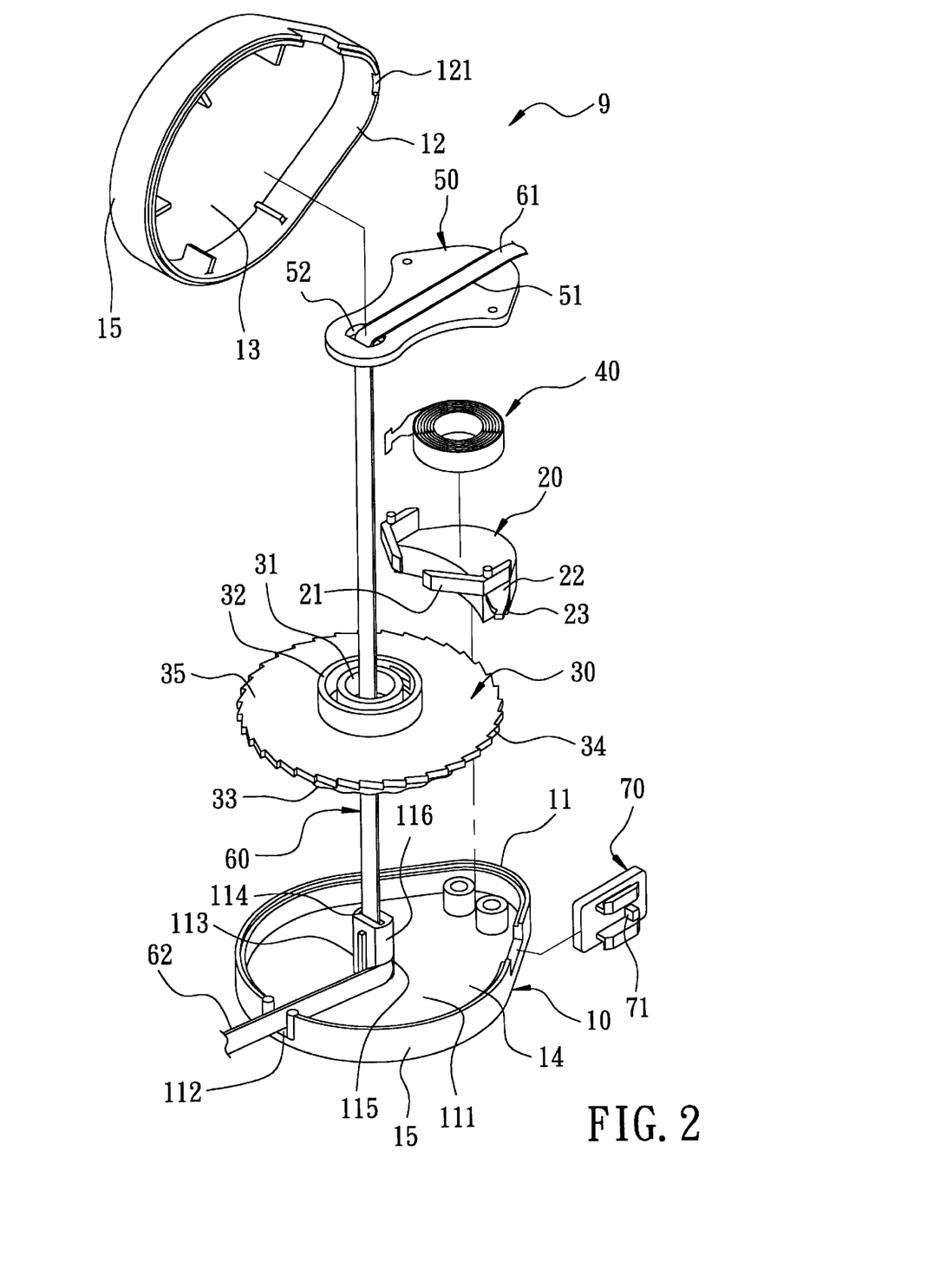
FIG. 2 is an exploded view of an automatically rewindable wire device embodying this invention.
Figure 3:
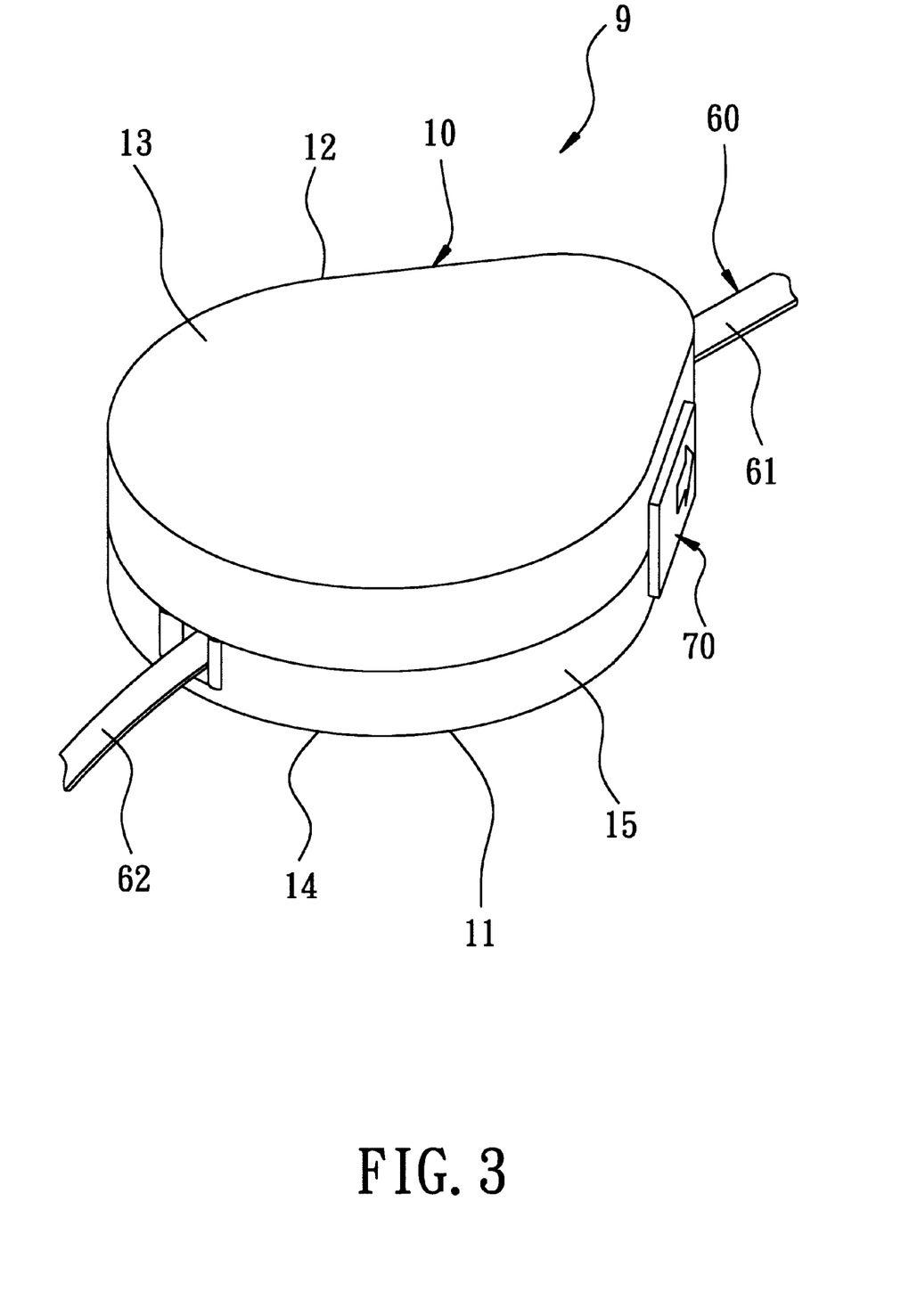
FIG. 3 is a perspective view of the automatically rewindable wire device of FIG. 2.
Figure 4:
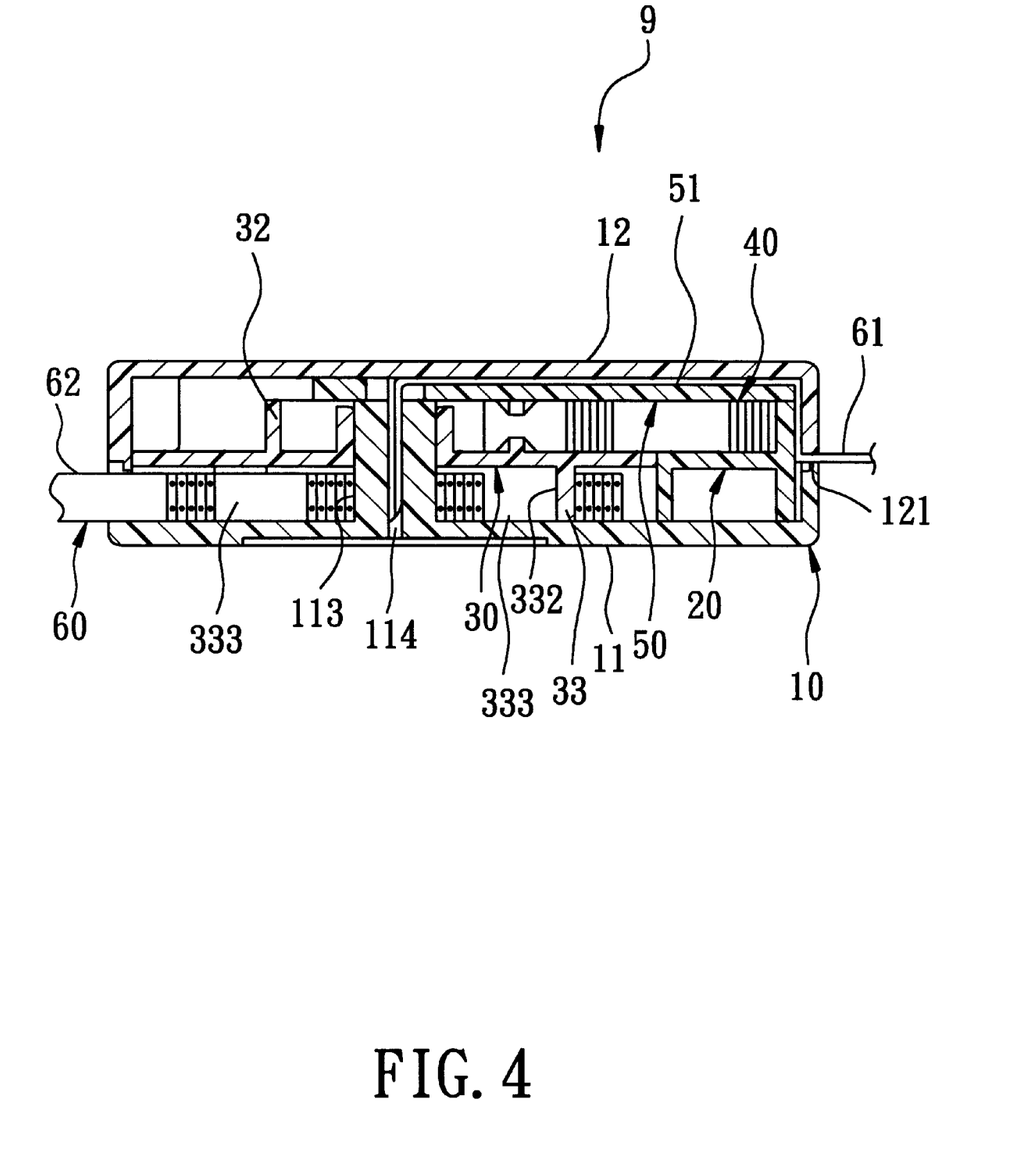
FIG. 4 is a cross-sectional side view of the automatically rewindable wire device of FIG. 3.

FIGS. 2 to 4 illustrate an automatically rewindable wire device 9 embodying this invention. The device 9 includes a housing 10, a seat 20, a rotary member 30, a windup spring 40, a guide plate 50, a connecting wire 60, and a press button 70.

The housing 10 includes upper and lower housing halves 11, 12 and has curved enlarged and tapered ends at the circumference thereof. The upper and lower housing halves 11, 12 define a top wall 13, a bottom wall 14, a surrounding wall 15, and a receiving space 111. First and second outlet slots 121, 112 are formed in the surrounding wall 15. A stationary hollow shaft 113 is raised uprightly from and is fixed to the bottom wall 14. The shaft 113 has an outer periphery 116, an axial passage 114 extending inside the shaft 113, and a slit 115 extending radially from the axial passage 114 and opening at the outer periphery 116.

The seat 20 is mounted on the bottom wall 14 adjacent to the tapered end of the housing 10. A pair of opposing restriction plates 21 extend inwardly of the housing 10 toward each other from the seat 20. The seat 20 includes an interference protrusion 22 extending outwardly from the seat 20 toward the rotary member 30. A flange 23 extends downwardly from the protrusion 22.

The rotary member 30 includes a disc 35, an annular upper extension 32 extending upwardly from the disc 35, and an annular lower extension 33 opposite to the upper extension 32 and extending downwardly from the disc 35. The disc 35 has a central hole 31 so as to permit the rotary member 30 to sleeve around and to rotate about the shaft 113. The lower extension 33 has a windup portion 332 around the shaft 113 so as to define a windup space 333 between the windup portion 332 and the shaft 113. The windup portion 332 has a grooved outer surface 334 and an opening 331 which is in communication with the windup space 333 and the receiving space 111, and which is spaced apart radially from the shaft 113. The disc 35 has a toothed peripheral edge 34 to engage the protrusion 22 of the seat 20.

The windup spring 40 is seated on and is confined by the seat 20. The windup spring 40 has one end connected to the upper extension 32 to urge the windup portion 332 to wind up the connecting wire 60.

The guide plate 50 is mounted on the seat 20 above the rotary member 30, and has two opposite ends, an aperture 52 formed in one of the two opposing ends and aligned above the axial passage 114, and a groove 51 extending from the aperture 52 to the other one of the two opposing ends adjacent to the first outlet slot 121.

The connecting wire 60 includes a first portion 61 fixed to the shaft 113 and a second portion 62 extending outwardly of the windup space 333 from the first portion 61 of the wire 60. The first portion 61 of the wire 60 extends inwardly of the shaft 113 via the axial passage 114, is received in the groove 51 by passing through the aperture 52, and then exits the housing 10 by passing through the first outlet slot 121. The second portion 62 of the wire 60 extends outwardly of the windup space 333 via the opening 331, and exits the housing 10 by passing through the second outlet slot 112. The second portion 62 of the wire 60 is also wound around the shaft 113 in a first angular direction within the windup space 333 and then wound around the windup portion 332 in a second angular direction. The second angular direction is opposite to the first angular direction.

Figure 7A:
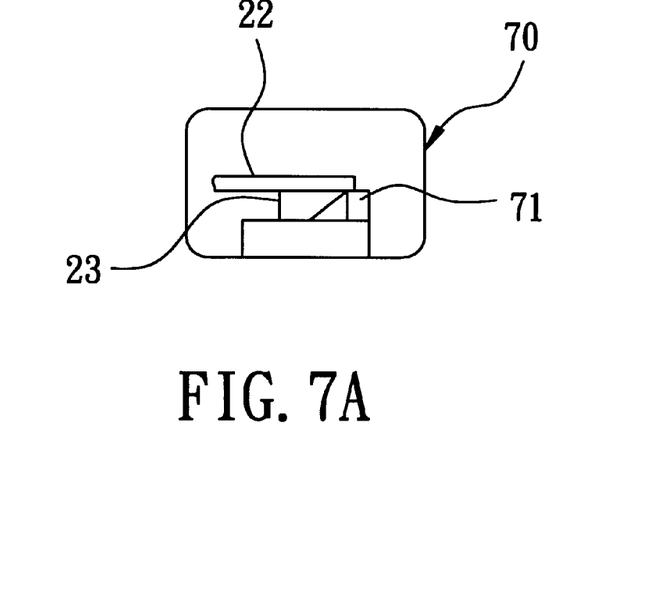
FIG. 7A is a schematic view of a press button of the automatically rewindable wire device of FIG. 3.
Figure 7B:
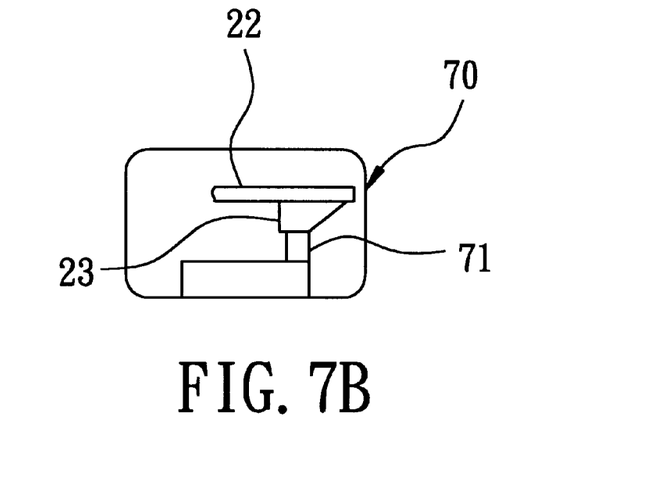
FIG. 7B is another schematic view of the press button of the automatically rewindable wire device of FIG. 3 in a position different from that shown in FIG. 7A.

Referring now to FIGS. 7A and 7B in combination with FIGS. 2 to 4, the press button 70 is slidably mounted on the surrounding wall 15, and has a pushing arm 71 projecting into the receiving space 111 of the housing 10 so as to slidably push the protrusion 22 to disengage the protrusion 22 from the toothed peripheral edge 34.

Figure 5:
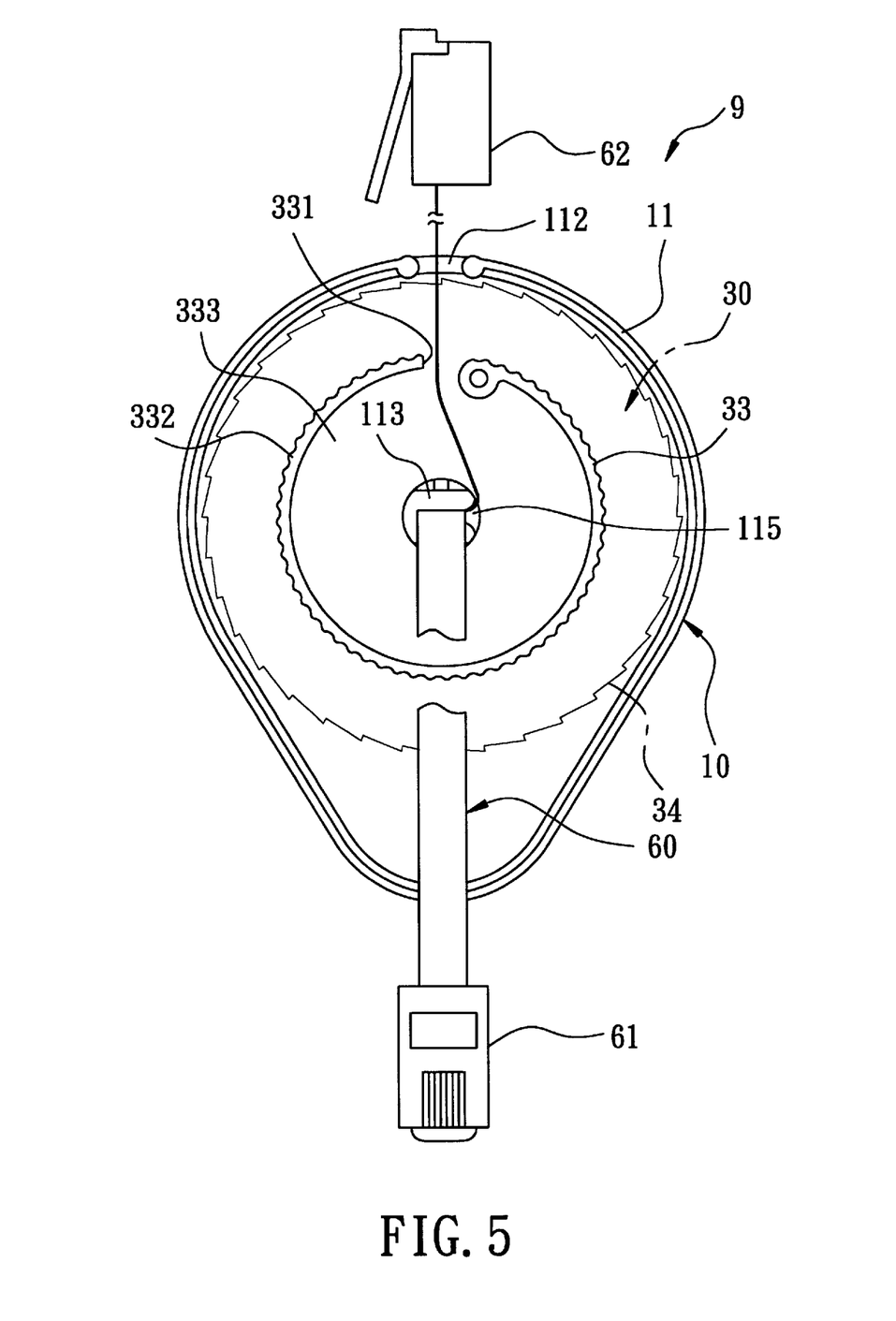
FIG. 5 is a schematic top view of the automatically rewindable wire device of FIG. 3 in an extended state.
Figure 6:
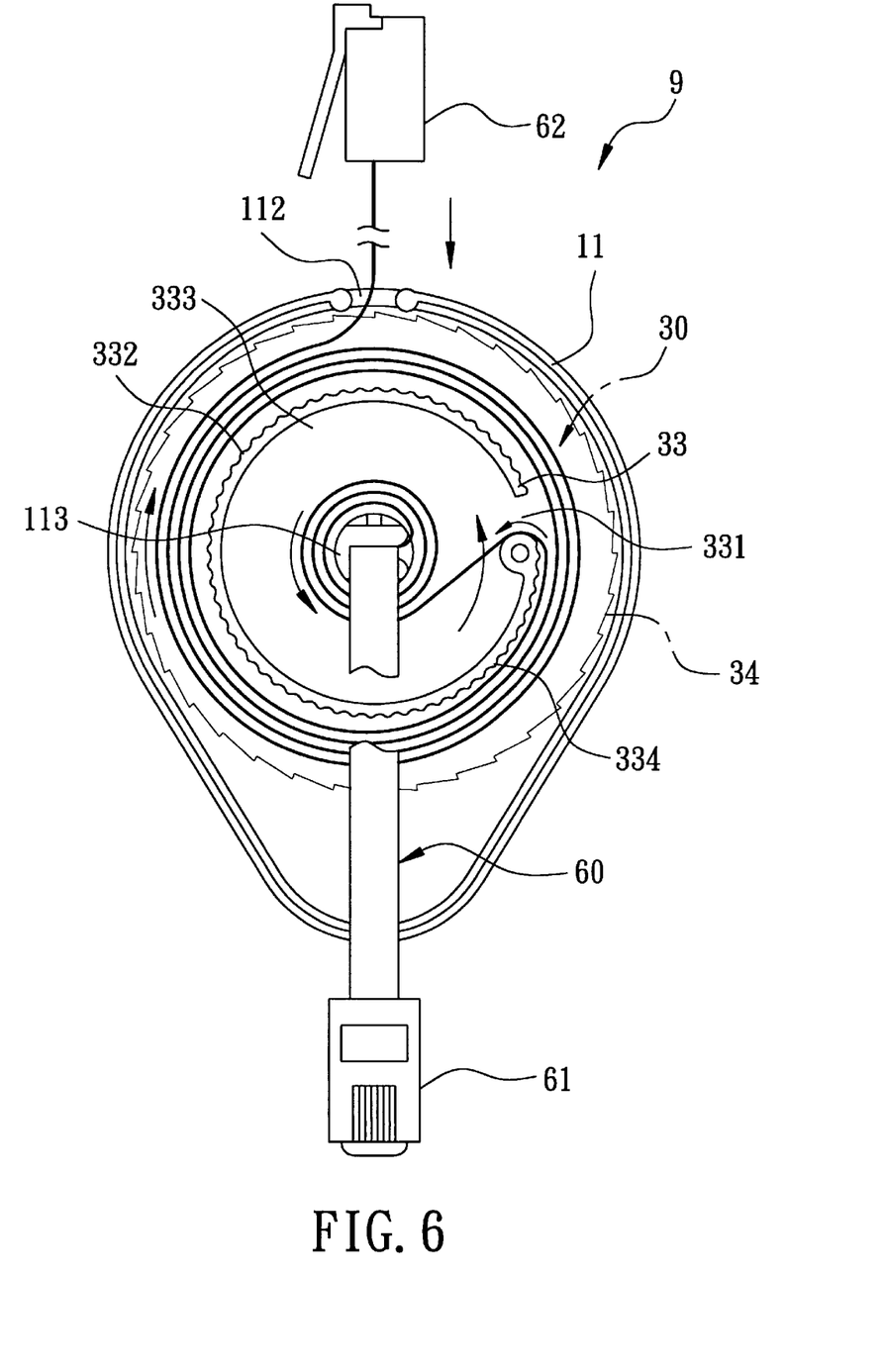
FIG. 6 is a schematic top view of the automatically rewindable wire device of FIG. 3 in a retracted state.

Referring now to FIGS. 5 and 6 in combination with FIGS. 2 to 4, as the second portion 62 of the wire 60 is pulled out from the receiving space 111 of the housing 10 (see FIG. 5), the windup spring 40 will be wound around the upper extension 32 (not shown). Since the windup spring 40 is in a tensioned condition, as the pulling action on the second portion 62 of the wire 60 is released, the windup spring 40 will urge the windup portion 332 to rotate, thereby winding up the second portion 62 of the wire 60 around the windup portion 332 in the second angular direction and around the shaft 113 in the first angular direction simultaneously (see FIG. 6). It is noted that, during the winding action of the second portion 62 of the wire 60 around the windup portion 332, the innermost portion of the second portion 62 of the wire 60 that was looped around the windup portion 332 will also be pulled into the windup space 333 by passing through the opening 331 and then wound around the shaft 113 upon the rotation of the windup portion 332.

In contrast with the winding action described above, as the second portion 62 of the wire 60 is pulled out of the housing 10, the outermost portion of the second portion 62 of the wire 60 that was looped around the shaft 113 will be pulled out of the windup space 333 by passing through the opening 331 and then wound around the windup portion 332 upon the rotation of the windup portion 332. The above described winding action of this invention prevents the first portion 61 of the wire 60 from twisting upon winding or pulling action on the second portion 62 of the wire 60.

Referring again to FIGS. 7A and 7B in combination with FIGS. 2 to 4, as the second portion 62 of the wire 60 is pulled out to an extended state, the windup spring 40 will be under tension and provides a restoring force to rotate the windup portion 332 about the shaft 113. However, due to the interference of the protrusion 22 with the toothed peripheral edge 34, the windup portion 332 is restricted from moving. When the press button 70 is slid relative to the surrounding wall 15 from a position shown in FIG. 7A to a position shown in FIG. 7B, the pushing arm 71 will push the flange 23, thereby moving the protrusion 22 away from the toothed edge 34 and rendering the windup portion 332 to rotate about the shaft 113.

With the invention thus explained, it is apparent that various modifications and variations can be made without departing from the spirit of the present invention. It is therefore intended that the invention be limited only as recited in the appended claims.

What is claimed is:

1. An automatically rewindable wire device, comprising:
   a stationary member having a stationary shaft;
   a rotary member mounted rotatably on said stationary member and having a windup portion around said shaft, said windup portion and said shaft confining a space, said windup portion having an opening which is communicated with said space and which is spaced apart radially from said shaft;
   a wire having a first portion fixed to said stationary member and a second portion extending from said first portion of said wire, said second portion of said wire being wound around said shaft in a first angular direction within said space and then wound around said windup portion in a second angular direction by passing through said opening, said second angular direction being opposite to said first angular direction; and
   a windup spring connected to said rotary member to urge said windup portion to wind up said wire.

2. The device as claimed in claim 1, wherein said windup portion has a cross-section of substantially C-shape and includes two opposite ends which confine said opening.

3. The device as claimed in claim 1, wherein said shaft includes an outer periphery, an axial passage extending inside said shaft, and a slit extending radially from said axial passage and opening at said outer periphery, said first portion of said wire extending into said axial passage.

4. The device as claimed in claim 3, wherein said wire is formed as a strip, and said axial passage has a narrow cross-section.

5. The device as claimed in claim 3, wherein said rotary member includes a disc, an annular upper extension extending upwardly from said disc, and an annular lower extension opposite to said upper extension and extending downwardly from said disc, said lower extension defining said windup portion.

6. The device as claimed in claim 5, further comprising a housing which includes a bottom wall, a top wall, and a surrounding wall interconnecting said bottom and top walls, said shaft extending from said bottom wall toward said top wall, said windup portion resting on said bottom wall around said shaft, said upper extension being disposed around said shaft adjacent to said top wall, said disc extending radially relative to said shaft between said windup portion and said upper extension.

7. The device as claimed in claim 6, further comprising a seat mounted inside said housing between said surrounding wall and said disc, said windup spring being seated on said seat between said surrounding wall and said upper extension, said upper extension being connected to said windup spring.

8. The device as claimed in claim 7, further comprising a guide plate disposed above said upper extension, said guide plate having two opposing ends, an aperture formed in one of said two opposing ends and aligned above said axial passage of said shaft, and an elongated groove extending from said aperture to the other one of said two opposing ends, said surrounding wall of said housing having a first outlet slot adjacent to said other one of said two opposing ends, said first portion of said wire extending out of said housing through said aperture, said groove, and said first outlet slot from said axial passage.

9. The device as claimed in claim 8, wherein said surrounding wall of said housing further has a second outlet slot opposite to said first outlet slot, said second portion of said wire extending outwardly of said housing, and exiting said housing through said second outlet slot.

10. The device as claimed in claim 9, wherein said windup portion has an outer surface which is grooved.

11. The device as claimed in claim 10, further comprising a press button slidably mounted on said surrounding wall, said disc having a toothed peripheral edge, said seat having a protrusion to engage said toothed peripheral edge for arresting rotation of said disc, said press button being slidable relative to said surrounding wall to engage and disengage said protrusion from said toothed peripheral edge.

12. An automatically rewindable wire device, comprising:

a stationary shaft;

a rotary member mounted rotatably on said shaft and having a windup portion sleeved around said shaft, said windup portion and said shaft confining a space, said windup portion having an opening which is communicated with said space and which is spaced apart radially from said shaft;

a wire having a first portion fixed to said shaft and a second portion extending outwardly of said space by passing through said opening from said first portion; and a windup spring connected to said rotary member to urge said windup portion to wind up said second portion of said wire around said shaft in a first angular direction within said space and around said windup portion in a second angular direction opposite to said first angular direction simultaneously.

\* \* \* \* \*